United States Patent
Wu et al.

(10) Patent No.: US 6,787,251 B1
(45) Date of Patent: Sep. 7, 2004

(54) RECORDING MEDIUM WITH A VARYING COMPOSITION UNDERLAYER

(75) Inventors: Zhong Stella Wu, Fremont, CA (US); Qixu David Chen, Milpitas, CA (US); Samuel Dacke Harkness, San Francisco, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/211,331

(22) Filed: Aug. 5, 2002

Related U.S. Application Data

(60) Provisional application No. 60/373,928, filed on Apr. 19, 2002.

(51) Int. Cl.$^7$ .............................. G11B 5/66; G11B 5/70; B05D 5/12
(52) U.S. Cl. ................................ 428/694 TS; 428/336; 428/900; 427/128; 427/130; 427/131
(58) Field of Search ........................... 428/694 TS, 900, 428/336; 427/128, 130, 131

(56) References Cited

U.S. PATENT DOCUMENTS

| | | | |
|---|---|---|---|
| 4,929,514 A | 5/1990 | Natarajan et al. | 428/611 |
| 5,298,324 A | 3/1994 | Ivett et al. | 428/336 |
| 5,356,522 A | 10/1994 | Lal et al. | 204/192.15 |
| 5,432,012 A | 7/1995 | Lal et al. | 428/610 |
| 5,580,667 A | 12/1996 | Lal et al. | 428/610 |
| 5,635,037 A | 6/1997 | Chu et al. | 204/192.35 |
| 5,772,857 A | 6/1998 | Zhang | 204/192.2 |
| 5,871,621 A | 2/1999 | Ross | 204/192.2 |
| 5,952,097 A | 9/1999 | Zhang | 428/332 |
| 6,037,052 A | 3/2000 | Chen et al. | 428/332 |
| 6,322,911 B1 | 11/2001 | Fukagawa et al. | 428/692 |
| 2002/0048694 A1 * | 4/2002 | Mukai et al. | 428/694 TS |

FOREIGN PATENT DOCUMENTS

JP    62267942    11/1987

* cited by examiner

Primary Examiner—Holly Rickman
(74) Attorney, Agent, or Firm—Morrison & Foerster LLP

(57) ABSTRACT

A bi-crystal magnetic recording medium, i.e., medium with Cr(200) and Co(11.0) orientations, having a CrW-containing underlayer in which the W content increases for improved lattice matching with a Co-alloy magnetic layer has high coercivity, high SMNR and high areal recording density.

19 Claims, 4 Drawing Sheets

- 34- Carbon overcoat
- 33- Co-alloy magnetic layer
- ← W rich
- 32 - Compositional varying underlayer
- ← Cr rich
- 31 - NiP-plated Al substrate Protective overcoat 23

Magnetic layer 22

Underlayer 21

Substrate 20

Underlayer 21'

Magnetic layer 22'

Protective overcoat 23'

34- Carbon overcoat

33- Co-alloy magnetic layer

← W rich

32 - Compositional varying underlayer

← Cr rich

31 - NiP-plated Al substrate

RECORDING MEDIUM WITH A VARYING COMPOSITION UNDERLAYER

RELATED APPLICATION

This application claims priority from Provisional Application Serial No. 60/373,928, filed Apr. 19, 2002, entitled "Recording medium design with continuously varying composition in underlayer for improved lattice match and crystallographic orientation," the entire disclosure of which is hereby incorporated herein by reference. This application is related to Ser. No. 09/497,524, filed February 2000, entitled "Magnetic recording media with Cr/CrW sublayer structure," the entire disclosure of which is hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise, and more particularly, to media having a continuously varying composition in the underlayer for improved lattice spacing match and crystallographic orientation.

BACKGROUND

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

The increasing demands for higher areal recording density impose increasingly greater demands on thin film magnetic recording media in terms of coercivity (Hc), remanent coercivity (Hr), magnetic remanance (Mr), which is the magnetic moment per unit volume of ferromagnetic material, coercivity squareness (S*), signal-to-medium noise ratio (SMNR), and thermal stability of the media. These parameters important to the recording performance and depend primarily on the microstructure of the materials of the media. For example, as decreasing the grain size reduces the SMNR or reducing exchange coupling between grains, it has been observed that the thermal stability of the media decreases.

The requirements for high areal density, i.e., higher than 30 Gb/in$^2$, impose increasingly greater requirements on magnetic recording media in terms of coercivity, remanent squareness, medium noise, track recording performance and thermal stability. It is extremely difficult to produce a magnetic recording medium satisfying such demanding requirements, particularly a high-density magnetic rigid disk medium for longitudinal and perpendicular recording.

As the storage density of magnetic recording disks has increased, the product of Mr and the magnetic layer thickness t has decreased and Hr of the magnetic layer has increased. This has led to a decrease in the ratio Mrt/Hr. To achieve a reduction in Mrt, the thickness t of the magnetic layer has been reduced, but only to a limit because the magnetization in the layer becomes susceptible to thermal decay and medium noise.

Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis that lies in the plane of the film. The better the in-plane c-axis crystallographic texture, the more suitable is the Co alloy thin film for use in longitudinal recording to achieve high remanance and coercive force. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains thereby decreasing intergranular exchange coupling. This type of microstructural and crystallographic control is typically attempted by manipulating the deposition process, and proper use of underlayers and seedlayers.

Underlayers can strongly influence the crystallographic orientation, the grain size and chemical segregation of the Co alloy grain boundaries. Underlayers include Cr and alloys of Cr with elements such as titanium (Ti), tungsten (W), molybdenum (Mo) and vanadium (V). It is recognized that the magnetic properties, such as Hcr, Mr, S and SMNR, which are critical to the performance of a magnetic alloy film, depend primarily upon the microstructure of the magnetic layer, which, in turn, is influenced by the underlying layers, such as the underlayer. It is also recognized that underlayers having a fine grain structure are highly desirable, particularly for growing fine grains of hcp Co alloys deposited thereon.

Goda et al. in U.S. Pat. No. 5,766,756 disclose a magnetic recording medium comprising a glass ceramic substrate and separately deposited chromium underlayers that can also comprise alloys of chromium, such as chromium tungsten. Lal et al. in U.S. Pat. No. 5,569,533 disclose a magnetic recording medium having an underlayer system comprising a first chromium or chromium alloy underlayer and a second chromium or chromium alloy underlayer on the first underlayer. Lal et al. in U.S. Pat. No. 5,456,978 disclose a magnetic recording medium comprising a chromium-containing sublayer interposed between the substrate and a chromium underlayer. Ivett et al. in U.S. Pat. No. 5,298,324 disclose a magnetic recording medium comprising a chromium-tungsten underlayer.

Cr/CrW double underlayer structure was disclosed in Ser. No. 09/497,524, which discloses a longitudinal media design in which two chromium alloys are coupled unidirectionally. The structure allows enhanced breakup of intergranular exchange coupling. This, in turn, affords media designers the ability to utilize high anisotropy, high magnetization materials that are generally also highly exchange coupled in their multilayer structure. Despite the advantages of the Cr/CrW double underlayer structure, Applicants found that the double underlayer structure results in the formation of the Cr and CrW interface which is prone to contamination as well as stress from lattice mismatch.

There exists a continuing need for high areal density longitudinal magnetic recording media exhibiting high Hcr and high SMNR.

SUMMARY OF THE INVENTION

The invention discloses bi-crystal magnetic recording media comprising a Cr and W containing underlayer possessing a strong crystallographic texture and a favorable lattice spacing match with the magnetic alloy of the magnetic recording layer. The lattice spacing match is achieved by varying the composition of W in the thickness direction of the underlayer. Therefore, one embodiment comprises an underlayer initially having substantially pure Cr and then having an increasing amount of W with increasing film thickness formed by co-sputtering, thereby eliminating a Cr and CrW interface. Such an underlayer has a fine grain size structure with strong (200) orientation as well as a large lattice constant by incorporating substantial amount of W near the top of the underlayer. Another embodiment relates to a method of manufacturing the magnetic recording medium containing a continuously varying composition in the underlayer for improved lattice spacing match and crystallographic orientation.

In this invention, "means for obtaining improved lattice spacing match of the magnetic recording layer" refers to a Cr and W containing underlayer having an increasing amount of W with increasing film thickness or equivalents thereof.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
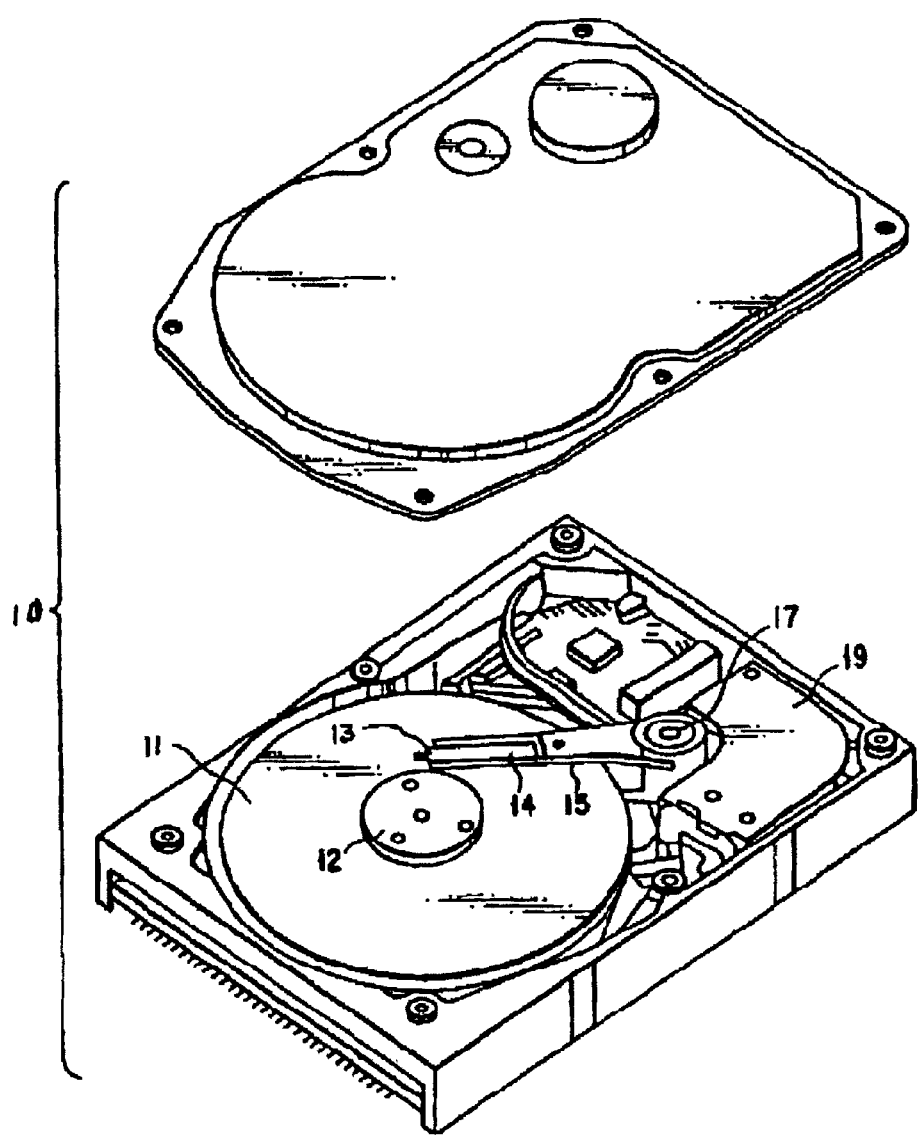
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
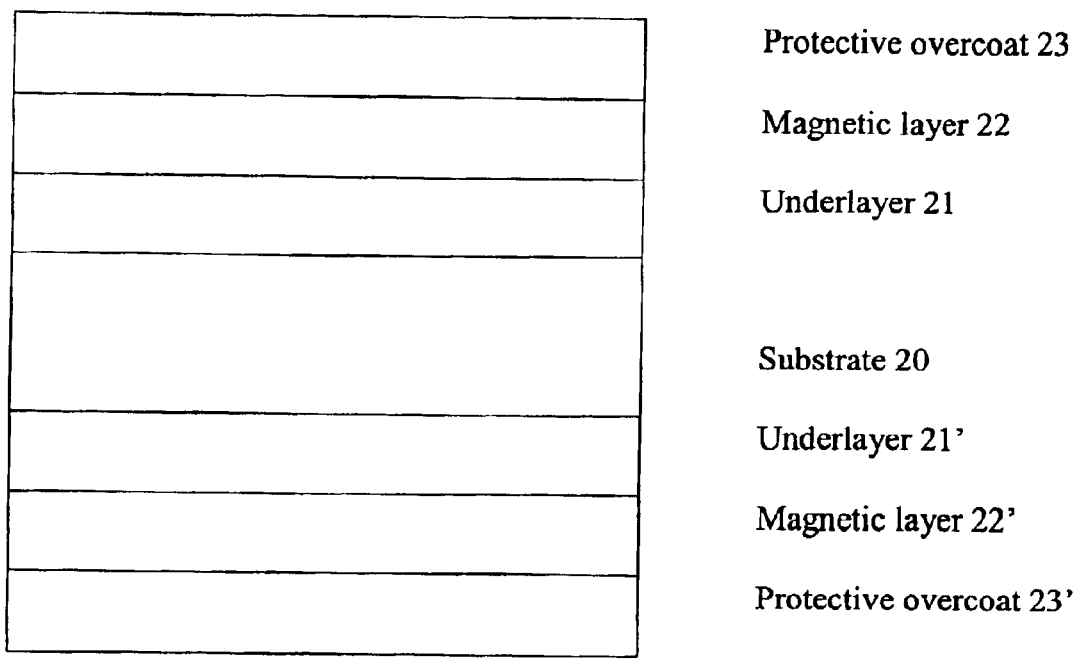
FIG. 2 is a schematic representation of the film structure in accordance with a magnetic recording medium of the prior art.

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. General practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by techniques normally comprises polycrystallites epitaxially grown on the polycrystal Cr or Cr-containing underlayer.

A longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Methods for manufacturing a longitudinal magnetic recording medium with a glass, glass-ceramic, Al or Al-NiP substrate may also comprise applying a seed layer between the substrate and underlayer. A seed layer seeds the nucleation of a particular crystallographic texture of the underlayer. A seed layer is the first deposited layer on the non-magnetic substrate. The role of this layer is to texture (alignment) the crystallographic orientation of the subsequent Cr-containing underlayer.

The seed layer, underlayer, and magnetic layer are conventionally sequentially sputter deposited on the substrate in an inert gas atmosphere, such as an atmosphere of argon. A carbon overcoat is typically deposited in argon with nitrogen, hydrogen or ethylene. Lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

Longitudinal magnetic recording media having Cr(200) and Co(11.0) preferred orientations are usually referred as bi-crystal media. Here, Cr(200) refers to bcc (body centered cubic) structured Cr-alloy underlayer or B2-structured underlayer with (200) preferred orientation. Generally, bi-crystal media have narrower c-axis dispersion than that of uni-crystal media. Therefore, bi-crystal media are more desirable than uni-crystal media, which have Co(10.0) preferred orientations. Typical bi-crystal media comprise Cr-containing alloy underlayers and Co-alloy magnetic layers. Cr-containing alloy has body centered cubic crystalline structure.

U.S. Pat. No. 5,933,956 (Lambeth) discloses a Cr-containing underlayer containing Mn in an amount sufficient for diffusion of Mn along the grain boundaries in the magnetic layer such that magnetic exchange coupling between grains is reduced. In this invention, Mn is not preferred because Mn-containing layer has a significant problem of corrosion.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed.

1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by using bi-crystal magnetic recording media, i.e., media with Cr(200) and Co(11.0) orientations, comprising a substrate, Cr and W containing bcc underlayer in which the W concentration varies in the direction of the thickness of the underlayer and a Co-alloy magnetic layer.

Figure 3:
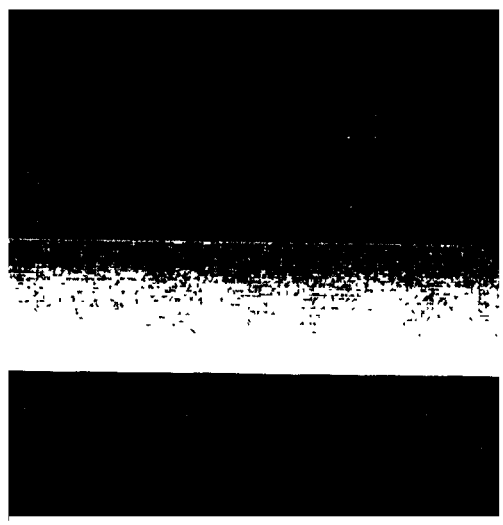
FIG. 3 shows an embodiment of the film structure according to the current invention.

FIG. 3 shows an embodiment of the film structure according to the current invention. The underlayer 32 that is Cr rich in the bottom and has increasing W composition in the direction of thickness is deposited on a NiP-plated substrate 31, and it preferably has a (200) crystallographic orientation. A Co-alloy magnetic layer 33 is epitaxially grown on the Cr-alloy underlayer and has a (11.0) preferred orientation. A carbon lubricant layer 34 is deposited on the magnetic layer 33.

In this application, word "containing," for example in Cr-containing, means that the layer comprises the elements or compounds before the word "containing" but the layer could still include other elements and compounds.

In one embodiment, the CrW layer could contain W in the range of about 0–50 at. %, and the maximum W composition at the top of this underlayer could be chosen to best match the c-axis of the C-containing magnetic material that was chosen as the storage layer(s). The Co-containing recording layer can comprise any Co-based alloy such as CoCrPt, CoCrPtTa, CoCrPtTaNb, and CoCrPtB. Each recording layer can be single magnetic layer or dual magnetic layers immediately adjacent to each other.

In a variation, there could further be seedlayer(s) of about 1.0 nm to about 160 nm thickness below this underlayer to nucleate growth for Al, glass or other substrate. A portion of the seed layer(s) and/or the underlayer(s) could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat in FIG. 3 could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)sCF_3$, $CF_3(CF_2)_{10}CF_3$, and $CF_3(CF_2)_{16}CF_3$.

The substrates that may be used in the invention include Al, glass, glass-ceramic, plastic/polymer material, ceramic, glass-polymer or composite materials.

Desirably, the lattice constant and the crystal plane of the seedlayer(s), if used, should closely match that of the seed layer. Similarly, matching between other layers, except with carbon overcoat, is also desirable. As a consequence of lattice and crystalline plane matching, the magnetic layer, in turn, will grow in a close-packed hexagonal structure with a Co(11.0) crystallographic orientations predominantly parallel to the film plane with the magnetic easy axis, c-axis, lying predominantly in the film plane.

In a preferred embodiment, the thickness of the optional seed layer could be about 10 Å to about 1600 Å. The thickness of this varying underlayer could be about 10 Å to about 500 Å, preferably between about 20 Å and about 100 Å, and most preferably between about 25 Å and about 50 Å. The thickness of the recording layer could be about 60 Å to about 300 Å, preferably between about 80 Å and about 200 Å, and most preferably about 100–190 Å. The thickness of the intermediate layer between this underlayer and Co-containing magnetic layer, if used, could be about 10 Å to about 60 Å, preferably between about 15 Å and about 50 Å, and most preferably about 20–25 Å. The thickness of the protective layer could be about 20 Å to about 300 Å, preferably between about 20 Å and 100 Å, and most preferably about 30 Å. The protective layer could be made of hydrogenated carbon, nitrogenated carbon, hybrid carbon, or a combination of them.

The magnetic recording medium has a remanent coercivity of about 3000 to about 10,000 Oersted, and an Mrt (product of remanance, Mr, and magnetic layer thickness, t) of about 0.2 to about 2.0 memu/$cm^2$. In a preferred embodiment, the coercivity is about 3500 to about 7000 Oersted, more preferably in a range of about 4000 to about 6000 Oersted, and most preferably in a range of about 4000 to about 5000 Oersted. In a preferred embodiment, the Mrt is about 0.25 to about 1 memu/$cm^2$, more preferably in a range of about 0.3 to about 0.6 memu/$cm^2$, and most preferably in a range of about 0.3 to about 0.45 memu/$cm^2$.

EXAMPLES

All samples described in this disclosure were fabricated with DC magnetron sputtering. The compositional varying underlayer was produced in a static sputter station with circular targets of pure Cr and pure W, and the film deposition was programmed to deposit substantially pure Cr at the bottom, and incrementally decreasing Cr target power and increasing W target power as the film deposition progresses, the W composition at the top of this compositional varying layer could be controlled at varying extent. The composition at the top of the underlayer was varied as shown in Table 1. In particular, the film structure and thickness of the samples in Table 1 CrW (200 Å)/C (40 Å).

TABLE 1

Composition, bcc (200) peak position and calculated lattice constant of four sample underlayers.

| Sample | UL* bottom | UL top | (200) 2-theta | bcc a (Å) |
|---|---|---|---|---|
| CE1** | 1 | Cr | Cr | 64.49 | 2.887 |
| E1*** | 2 | Cr | $Cr_{90}W_{10}$ | 64.18 | 2.900 |
| E2 | 3 | Cr | $Cr_{85}W_{15}$ | 63.88 | 2.912 |
| E3 | 4 | Cr | $Cr_{80}W_{20}$ | 63.34 | 2.934 |

*UL = Underlayer
**CE = Comparative Example
***E = Example

The underlayer samples were produced by programming the deposition into 4 steps in which each subsequent step had increased W power and decreased Cr target power to obtain a substantially smooth lattice spacing expansion along the thickness direction of the underlayer. The last step had a sputter ratio of these two elements reflecting the compositions listed in Table 1. With the help of revised software, it would be possible to linearly change the compositions of Cr and W to obtain a smooth lattice spacing expansion along the thickness direction of the underlayer.

A "substantially smooth lattice expansion along the thickness direction of the underlayer" is obtained when the lattice spacing at three or more points along a line in the thickness direction of the underlayer plotted as a function of the depth from the top of the underlayer produces a line without a discrete break in the line. For example, assume that the lattice spacing at depths $d_1$, $d_2$ and $d_3$ from the top of the underlayer is $l_1$, $l_2$ and $l_3$, respectively. Then, plot lattice spacing ($l_1$, $l_2$ and $l_3$) versus depth from the top of the underlayer ($d_1$, $d_2$ and $d_3$). If the plot is a line without a discrete break in the line, then there is substantially smooth lattice expansion along the thickness direction of the underlayer.

As one would recognize, just two sublayers in an underlayer, wherein each sublayer has a substantially uniform composition other than the variation inherent due to sputtering, cannot produce a substantially smooth lattice expansion along the thickness direction of the underlayer. At least three sublayers of substantially uniform composition in an underlayer are required to produce a substantially smooth lattice expansion along the thickness direction of the underlayer.

Table 1 shows a summary of 4 samples with 200 Å total underlayer thickness and varying W composition at top of layer, their bcc (200) peak position detected by x-ray diffraction and calculated lattice constant are listed.

When the W target power was increased to obtain an underlayer with increased W composition at the top, the bcc (200) 2-theta peak intensity increases while the peak position moves to a lower angle. Therefore, the lattice constant increases when W composition increases. As a result, when 200 Å $Co_{63}Cr_{20}Pt_{17}$ magnetic layer is deposited on these 4 samples, the Co (112-0) peak intensity will show a systematic increase from sample 1 to sample 4 due to a stronger (200) orientation and better lattice spacing match.

Figure 4:
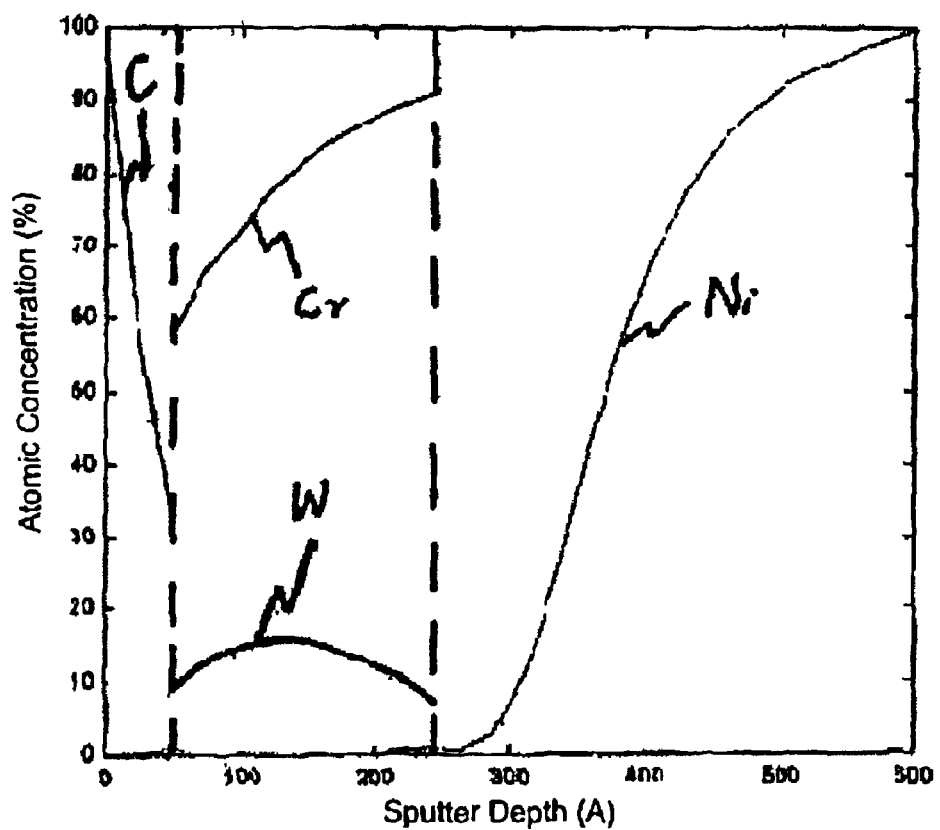
FIG. 4 shows ESCA depth profile of sample 3.

FIG. 4 shows the ESCA depth profile of chemical compositions for sample #3, a representative sample of Examples 1–3, with left edge representing the top of the sample. In FIG. 4, the layer from 0 Å to 40 Å is a carbon overcoat layer, the next layer from 40 Å to 240 Å is the Cr and W-containing underlayer, and the last layer is from 240 Å to 600 Å is the NiP layer on the Al substrate. FIG. 4 shows that the Cr composition continuously decreases and W composition increases from the bottom to the middle of the underlayer without a discrete break in the Cr and W composition through the thickness of the underlayer. As shown in FIG. 4, the atomic concentration of a component (Cr or W) in the underlayer varies by more than 5 atomic percent through the thickness of the underlayer. FIG. 4 shows W concentration decreases from the middle to the top of the underlayer. This is an artifact of the ESCA measurement because the W target power as the film deposition progressed had been increased during the fabrication of the samples.

The plots of Cr and W concentration in FIG. 4 demonstrate how the concentration of a component varies continuously in the underlayer. The term "varies continuously" means that the value of variable (V), for example, concentration or lattice spacing, from one point to another as a finction of depth (p) in the thickness direction of the underlayer is different, which means dV/dp is not zero except at points of inflexion.

Table 2 shows the Hcr, Mrt and S* values of four samples similar to samples 1–4 in Table 1 with a 200 Å $Co_{63}Cr_{20}Pt_{17}$ magnetic layer having a lattice spacing that is substantially larger than Cr underlayer. The first sample (Comparative Example 2) shows no reading for Hcr and S* on magnetometer due to very low values. Table 2 shows that the magnetic properties improved due to the much improved crystallographic orientation and lattice spacing match.

TABLE 2

Hcr, Mrt and S* of four sample underlayers similar to samples 1–4.

| Sample | Hcr (Oe) | Mrt (memu/cm$^2$) | S* |
|---|---|---|---|
| CE2** | 5 | No reading | 0.367 | No reading |
| E4*** | 6 | 2462 | 0.503 | 0.87 |
| E5 | 7 | 3254 | 0.528 | 0.91 |
| E6 | 8 | 3717 | 0.538 | 0.92 |

**CE = Comparative Example
***E = Example

Applicants have demonstrated that co-sputtering of Cr and W to form an underlayer with varying composition such that there is substantially pure Cr at the bottom and $CrW_x$ at the top, wherein x is greater than zero and less than 100, produces better lattice constant match with the magnetic material deposited on top. While the examples use a few compositions of Cr and W in the underlayer, one could use any combination of Cr and W depending on lattice spacing match required to match the lattice constants of the magnetic material.

For example, the value of x in an underlayer of composition $CrE_x$ could be 1, 2, 5, 10, 15, 20, 25, 30, 35, 40, 45, 50, 55, 60, 65, 70, 75, 80, 85, 90, 95 and 99. E is one or more components that have a range of solubility with Cr, could be used to produce bcc structure with (200) orientation and have a larger lattice spacing than that of pure Cr. E could be W, V, Mo, Mn, Ti, Ta, and combinations thereof. The total underlayer thickness could range from 10 to 1000 Å, with preferably range of 50 to 200 Å. Substrate bias during the sputtering of this underlayer can be used optionally. The substrate being used could be Al dominated conductive type, or glass, glass ceramic type, with optional seedlayer below this underlayer, and/or intermediate layer above. The magnetic alloys being used could be Co alloys with at least one element from a collection of Cr, Pt, B, Ta, Nb, Si, etc. The magnetic layers for storage could be single layers, or multiple adjacent layers, or laminated structure with thin non-magnetic spacing.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A magnetic recording medium, comprising a substrate, an underlayer and a magnetic recording layer, wherein the underlayer has a substantially smooth lattice spacing expansion along the thickness direction of the underlayer and the atomic concentration of a component of the underlayer varies by more than 5 atomic percent through the thickness of the underlayer wherein the composition of the underlayer comprises $CrE_x$ wherein $0<x<100$ and E is W, V, Mo, Mn, Ti, Ta or combinations thereof, and further wherein the underlayer is a single layer.

2. The magnetic recording medium of claim 1, wherein the atomic concentration of a component of the underlayer varies without a discrete break through the underlayer.

3. The magnetic recording medium of claim 1, wherein the atomic concentration of a component of the underlayer varies continuously through the underlayer.

4. The magnetic recording medium of claim 1, wherein the underlayer comprises Cr and W.

5. The magnetic recording medium of claim 1, the underlayer comprising $CrE_x$, wherein E produces a bcc structure with a (200) orientation and has larger lattice spacing than that of Cr.

6. The magnetic recording medium of claim 1, wherein the underlayer is a single layer without an interface within the single layer.

7. The magnetic recording medium of claim 1, wherein the underlayer has different lattice spacing at top and bottom of the underlayer.

8. The magnetic recording medium of claim 1, wherein a lattice spacing of the underlayer varies continuously through the thickness of the underlayer.

9. The magnetic recording medium of claim 1, wherein a thickness of the underlayer is from about 10 Å to about 1000 Å.

10. The magnetic recording medium of claim 1, wherein the magnetic recording layer has substantially the same or larger lattice spacing as that at the top of the underlayer.

11. A method of manufacturing a magnetic recording medium comprising depositing an underlayer on a substrate and depositing a magnetic recording layer on the underlayer, wherein the underlayer has a substantially smooth lattice spacing expansion along the thickness direction of the underlayer and the atomic concentration of a component of the underlayer varies by more than 5 atomic percent through the thickness of the underlayer wherein the composition of the underlayer comprises $CrE_x$ wherein $0<x<100$ and E is W, V, Mo, Mn, Ti, Ta or combinations thereof, and further wherein the underlayer is a single layer.

12. The method of claim 11, wherein the atomic concentration of a component of the underlayer varies without a discrete break through the underlayer.

13. The method of claim 11, wherein the atomic concentration of a component of the underlayer varies continuously through the underlayer.

14. The method of claim 11, wherein the underlayer comprises Cr and W.

15. The method of claim 11, wherein the atomic concentration of a component of the underlayer varies by more than 10 atomic percent through the thickness of the underlayer.

16. The method of claim 11, wherein the underlayer is a single layer without an interface within the single layer.

17. The method of claim 11, wherein the underlayer has different lattice spacing at top and bottom of the underlayer.

18. The method of claim 11, wherein a lattice spacing of the underlayer varies continuously through the thickness of the underlayer.

19. The method of claim 11, wherein a thickness of the underlayer is from about 10 Å to about 500 Å.

* * * * *